US007412073B2

(12) United States Patent
Alasia et al.

(10) Patent No.: US 7,412,073 B2
(45) Date of Patent: *Aug. 12, 2008

(54) SYSTEM AND METHOD FOR AUTHENTICATING OBJECTS USING NON-VISUALLY OBSERVABLE ENCODED INDICIA

(75) Inventors: Alfred V. Alasia, Lake Worth, FL (US); Alfred J. Alasia, Royal Palm Beach, FL (US); Thomas C. Alasia, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 505 days.

This patent is subject to a terminal disclaimer.

(21) Appl. No.: 11/197,613

(22) Filed: Aug. 4, 2005

(65) Prior Publication Data

US 2005/0269817 A1 Dec. 8, 2005

Related U.S. Application Data

(63) Continuation of application No. 11/077,839, filed on Mar. 11, 2005, now Pat. No. 7,315,629, which is a continuation of application No. 10/810,000, filed on Mar. 26, 2004, now Pat. No. 6,985,607.

(60) Provisional application No. 60/458,088, filed on Mar. 27, 2003.

(51) Int. Cl.
*G06K 9/00* (2006.01)

(52) U.S. Cl. ...................... 382/100; 382/112; 382/232; 382/233

(58) Field of Classification Search ................ 382/112, 382/100, 232, 233; 427/7; 283/111; 523/160
See application file for complete search history.

(56) References Cited

U.S. PATENT DOCUMENTS

| | | | | | |
|---|---|---|---|---|---|
| 5,093,147 | A * | 3/1992 | Andrus et al. | 427/7 |
| 5,990,197 | A * | 11/1999 | Escano et al. | 523/160 |
| 6,712,399 | B1 * | 3/2004 | Drinkwater et al. | 283/111 |
| 6,985,607 | B2 * | 1/2006 | Alasia et al. | 382/112 |
| 7,052,730 | B2 * | 5/2006 | Patel et al. | 427/7 |
| 7,315,629 | B2 * | 1/2008 | Alasia et al. | 382/112 |
| 2003/0210803 | A1 * | 11/2003 | Kaneda et al. | 382/100 |

OTHER PUBLICATIONS van Renesse, "Paper Based Document Security—A Review", IEEE, Apr. 1997, pp. 75-80.*

* cited by examiner

*Primary Examiner*—Anh H Do
(74) *Attorney, Agent, or Firm*—Hunton & Williams LLP

(57) ABSTRACT

A method for authenticating an object is provided. The method comprises optically encoding an authentication image to produce an encoded image and applying the encoded image to an object in a layer of non-visible indicia to form a non-visible encoded image. The non-visible encoded image may be rendered visible and decoded to allow the authentication image to be viewed.

17 Claims, 5 Drawing Sheets

SYSTEM AND METHOD FOR AUTHENTICATING OBJECTS USING NON-VISUALLY OBSERVABLE ENCODED INDICIA

RELATED APPLICATIONS

This application is a continuation of U.S. application Ser. No. 11/077,839, now U.S. Pat. No. 7,315,629, filed Mar. 11, 2005, which is a continuation of U.S. application Ser. No. 10/810,000, now U.S. Pat. No. 6,985,607 filed Mar. 26, 2004 and which claims the benefit of U.S. Provisional Application No. 60/458,088 entitled "System and Method of Authenticating Objects at a Distance" filed Mar. 27, 2003, each of which is incorporated herein by reference in its entirety.

BACKGROUND OF THE INVENTION

The present invention relates generally to systems and methods for authenticating objects.

Every year, the sale of counterfeited goods is responsible for tens of millions of dollars in losses for U.S. and foreign companies. Goods, such as food products, consumer products, textiles and other items, are produced illegally by counterfeit operations that then sell them on the black market. These counterfeit goods may be passed along to legitimate retailers as goods originating from the known manufacturer even though they are false. Many companies have attempted to solve this problem by spot checking supplies/inventories of goods that have made their way into the hands of legitimate retailers. Nonetheless, these attempts have not been successful in stopping the problem because it is often impractical to check large volumes of goods that may be stored in a given warehouse, for example.

SUMMARY OF THE INVENTION

Accordingly, there is a need for an efficient system and method for authenticating objects. The present invention provides systems and methods for authenticating objects that overcome the disadvantages of known systems and methods while offering features not present in known systems and methods.

A method for authenticating objects is disclosed. The method comprises providing at least one object having a print region with printed material contained thereon comprising a layer of non-visible indicia, wherein the layer of non-visible indicia comprises a substance that emits at least one wavelength of light outside a visible range of an electromagnetic spectrum when stimulated with electromagnetic radiation. The method further comprises creating an optical image of the layer of non-visible indicia with an imaging device such that the layer of non-visible indicia can be perceived by a human eye viewing the optical image, recording the optical image of the object including the layer of non-visible indicia, attaching identification information pertaining to the object to the recorded optical image, and comparing the optical image of the layer of non-visible indicia to expected authentication indicia to verify the authenticity of the object.

A system for authenticating objects having a print region with printed material contained thereon, the printed material including a layer of non-visible indicia that emits light outside of a visible range of an electromagnetic spectrum when stimulated with electromagnetic radiation is also disclosed. The system comprises at least one imaging device capable of creating and recording optical images of the objects, including the layer of non-visible indicia such that the non-visible indicia is perceivable to a human eye viewing the optical images and a central authentication system in communication with the at least one device to receive optical images recorded by the imaging device.

BRIEF DESCRIPTION OF THE DRAWINGS

The present invention can be more fully understood by reading the following detailed description of the presently preferred embodiments together with the accompanying drawings, in which like reference indicators are used to designate like elements, and in which.

DETAILED DESCRIPTION OF THE INVENTION

In accordance with one embodiment of the invention, a method of authenticating an object is disclosed. The method generally includes producing objects for use in an authentication system, distributing those objects, and authenticating those objects in the field. The objects for use in accordance with the invention may include any item, good or material having a surface upon which indicia or other identifying marks may be applied, or printed upon. For example, objects may include, but not be limited to, commercial goods such as packaging boxes, documents, product labels, and food containers. The application of non-visible and visible indicia to these and other objects allows manufacturers to easily authenticate objects that make their way into the commercial stream. The authentication of goods in the commercial stream increases the protection placed on the manufacturer's goodwill and product safety.

Objects produced for authentication in accordance with exemplary embodiments of the invention are printed upon in such a manner that they include indicia which have optical characteristics that are not visible to the naked eye, but which can be viewed through the use of an imaging device with specially viewing capabilities. Typically, this involves the use of inks and toners which have properties that allow them to be viewed in regions of the electromagnetic spectrum outside of, or in addition to, the visible spectrum. In certain cases, the inks and toners may be viewable in both the visible spectrum and outside the visible spectrum, in which case the printed indicia may be covered by an overlay layer to conceal the visible portions of the indicia. In other cases, the inks and toners may be viewable only outside the visible spectrum by using a special imaging device, in which case no overlay layer may be desired.

The imaging device may then capture an optical image of the indicia which can be compared against an expected set of authentication indicia to verify the authenticity of the object bearing the indicia.

Figure 1:
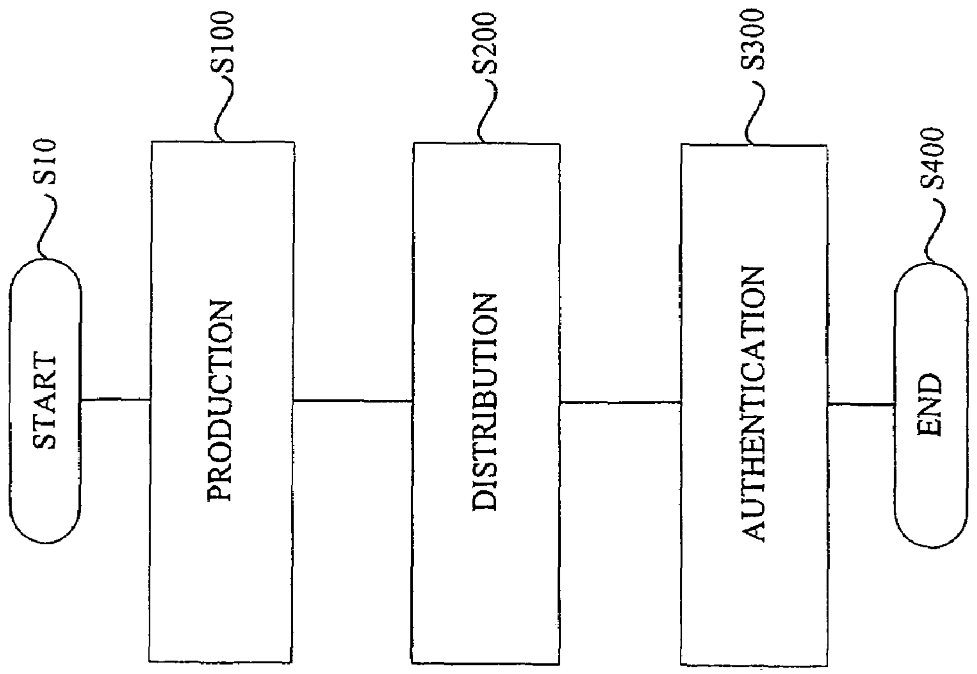
FIG. 1 is a flowchart illustrating a method of authenticating an object in accordance with one embodiment of the invention.

FIG. 1 is a flowchart illustrating a method of authenticating an object in accordance with one embodiment of the invention. As shown in FIG. 1, the process begins in step S10 and passes to step S100. In step S100, an object for use in an authentication system is produced. Following production, the process passes to step S200, in which the object for use in the authentication system is distributed. Then, in step S400, the process ends.

It should be appreciated that distribution may include conventional distribution procedures for commercial products. For example, this may include the distribution of food products, i.e., boxes of pasta products, to wholesalers or retailers across a certain region or nationwide. Following the initial distribution of the objects into the commercial stream, in step S300, it may be desirable to monitor the authenticity of related objects in the field. It should further be appreciated that the authentication of the object may take place before the object reaches the final retailer. For example, the invention is ideally suited for use in authenticating stores of products kept in warehouse inventories.

Cameras or other imaging devices may be used to capture images of the objects and more particularly the non-visible indicia contained thereon, thus making the methods particularly advantageous for authenticating objects at a distance such that an individual charged with capturing the images may record many images from a single location. Accordingly, the individual does not necessarily need to be in close proximity to the object to capture an image of the object capable of verifying the object's authenticity. For example, the individual may typically be 4-5 feet away from the object be authenticated, and in many situations may be up to 20-30 or more feet away from the object.

Thus, the authentication is especially adapted for use in an environment wherein large quantities of objects, or products, are found in storage positions requiring inspections from great distance. For example, in a warehouse, packages of products may be stacked on palettes or other storage methods that extend up to the ceiling of a warehouse. An individual charged with investigating the authenticity of those products will not practicably be able to inspect the products in each of the boxes. Thus, the inventive method disclosed herein is advantageous for investigating the authenticity of the products from the packaging containers for increased inspection efficiency.

Figure 2:
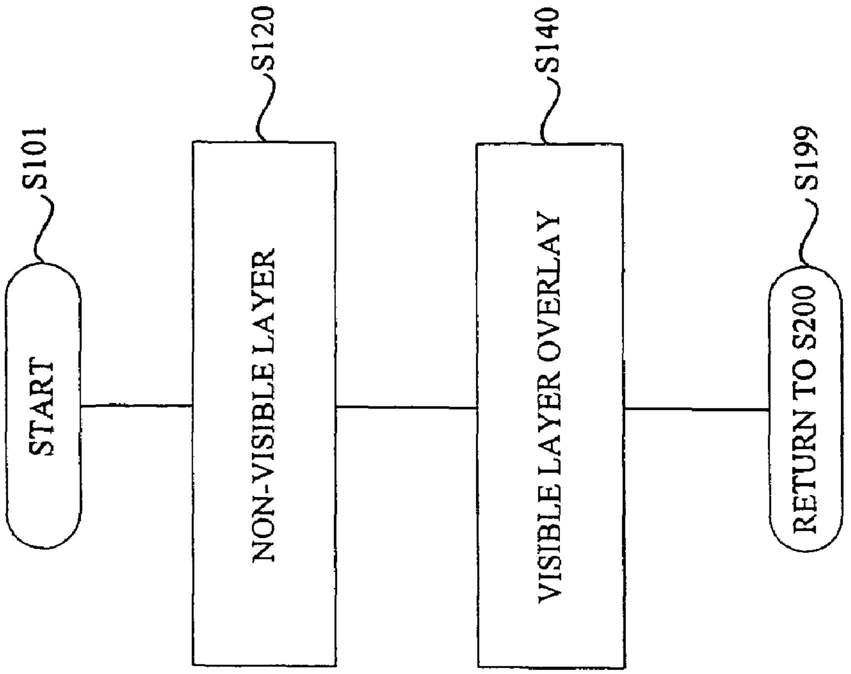
FIG. 2 is a flowchart illustrating the production step of FIG. 1 in further detail in accordance with one embodiment of the invention.

FIG. 2 is a flowchart illustrating the production step of FIG. 1 in further detail in accordance with one embodiment of the invention. As shown in FIG. 2, the production process begins in step S101, and passes to step S120, in which a layer of non-visible indicia is applied to the object for use in the authentication system. This includes applying a layer of non-visible indicia, such as a printed image, to a print region on the object. The print region may be any printable surface of the object.

By "non-visible" is meant that the indicia comprises at least a first substance not visible to the naked human eye but that can be seen with the aid of an imaging device that has special viewing capabilities outside of the visible spectrum. However, the term does not necessarily mean that the indicia is invisible. For example, in at least one embodiment of the invention, the first substance is comprised of an ink or toner containing carbon black, which is visible in the infrared portion of the electromagnetic spectrum and which is also visible in the visible light portion of the electromagnetic spectrum. The infrared portion of the electromagnetic spectrum includes electromagnetic radiation with wavelengths ranging from about $10^6$ nm to about 770 nm and the visible portion of the electromagnetic spectrum includes electromagnetic radiation with wavelengths ranging from about 400 to about 770 nm.

While the present embodiments are described using a substance viewable in the infrared spectrum, it should be appreciated that substances may be used that are visible in other spectrums not visible to the naked human eye, such as the ultraviolet spectrum, to accomplish a similar result.

Although the non-visible layer includes a substance that is not visible to the naked human eye, the substance is capable of being perceived by the human eye through the use of a special imaging device, such as a camera with infrared viewing capabilities.

It should be appreciated that the layer of non-visible indicia may be applied in any pattern or shape as desired by the skilled artisan. For example, the non-visible indicia may be printed upon the object as a company logo or other identifiable image. Additional embodiments may include barcode information, symbol digital glyphs, digitally scrambled or variable encoded indicia or images, such as those described in U.S. Pat. No. 5,708,717, which is incorporated by reference in its entirety, point of origin information, or other unique information used in the identification or tracking of the object's source.

For those embodiments utilizing barcode information, it should be appreciated that once the non-visible indicia including barcode information is perceived, standard barcode techniques may be used for its reading.

For those embodiments utilizing encoded indicia such as those described in U.S. Pat. No. 5,708,717, for example, an encoded image may be created by raterizing and embedding an authentication image in the encoded image. The rasterization may be effected at a certain frequency, i.e. a certain number of lines per inch, such that the authentication image cannot ordinarily be seen when viewing the encoded image normally. When a lenticular lens having a frequency equal to that of the encoded image is placed over the encoded image, the authentication image is revealed. Accordingly, once the layer of non-visible indicia which comprises an encoded image is perceived with the imaging device, a lenticular lens or other method of "decoding" the image may be used to reveal the authentication image contained within the encoded image, thereby further verifying the authenticity of the object as described therein.

It should be appreciated that any known method for producing an encoded image through the use of various optical patterns and the like that can later be decoded through the use of a decoding device may be used. In certain embodiments, the decoding device may effectively be used as a filter positioned between the indicia and the imaging device so that the authentication image is recorded directly, while in other embodiments, the decoding device may be used after the encoded image has already been recorded, so that the authentication image is revealed when the decoding device is placed over the recorded image.

Returning to FIG. 2, in step S 140, an overlay layer may be used to cover the layer of non-visible indicia. The overlay layer is printed with a substance that preferably does not have non-visible wavelength characteristics. For example, when the non-visible indicia is printed with material that is visible in the infrared range, the overlay layer is preferably not visible in the infrared spectrum to avoid interfering with the perceived image of the non-visible indicia when viewing the non-visible indicia with the aid of the imaging device. The substance used in applying the overlay layer, however, is visible in the visible light portion of the electromagnetic spectrum. The overlay layer is applied so that an individual perceiving the print region of the object with the naked eye (without the aid of any imaging device) would only see the overlay layer, and not any layer or layers, including the layer of non-visible indicia underneath. In at least one embodiment, the overlay layer comprises a visible organic black ink or toner, such as vegetable dye, to conceal any portion of the non-visible indicia in the visible spectrum.

Following the application of the overlay layer, when used, the process passes to step S199, wherein the process returns to step S200.

It should be appreciated that in certain embodiments of the invention, such as where the non-visible indicia is not visible in the visible spectrum, that the overlay layer is optional. Materials used in printing the layer of non-visible indicia may be selected so that the materials do not contain any pigments that emit light in the visible spectrum. For example, the non-visible layer may be printed with a substance that emits light only outside of the visible spectrum when stimulated with electromagnetic radiation. In this case, the non-visible layer would be invisible to the naked human eye, with no way for a counterfeiter or other person to discern between an unprinted surface and a surface in which the non-visible layer was printed with the invisible ink. In this case, there would be no need for an overlay layer to conceal visible portions of the non-visible layer, although an overlay layer may still be used.

Various types of inks and toners for the layer of non-visible indicia may be used, including those that contain phosphorous or other fluorescing and phosphorescing materials. Selection of a particular ink or toner may depend on the desired application or level of security. For example, an ink may be used to print the layer of non-visible indicia that is invisible when applied to avoid the need for an overlay layer as discussed above. Further, an ink may be selected that only emits light (i.e. fluoresces) outside the visible spectrum and only then when first stimulated by light which is also outside the visible spectrum. Thus, even if a counterfeiter suspected that a package might contain an image for authenticating objects, the counterfeiter would not be able to perceive the image of the layer of non-visible indicia by simply viewing it with an imaging device having enhanced viewing capabilities unless the counterfeiter first provided an external source of electromagnetic stimulation. This would further require the counterfeiter to determine what type of external stimulation would accomplish the desired result. Preferably, inks and toners are used which do not fluoresce in the visible spectrum.

Alternatively, light sources such as lasers that emit visible light in addition to other sources of electromagnetic radiation may also be used to stimulate the non-visible layer.

Particularly suitable inks and toners can be prepared using infrared emitting phosphorescing powders. However, any inks or toners that exhibit emission spectra outside the visible spectrum may be used.

Figure 4:
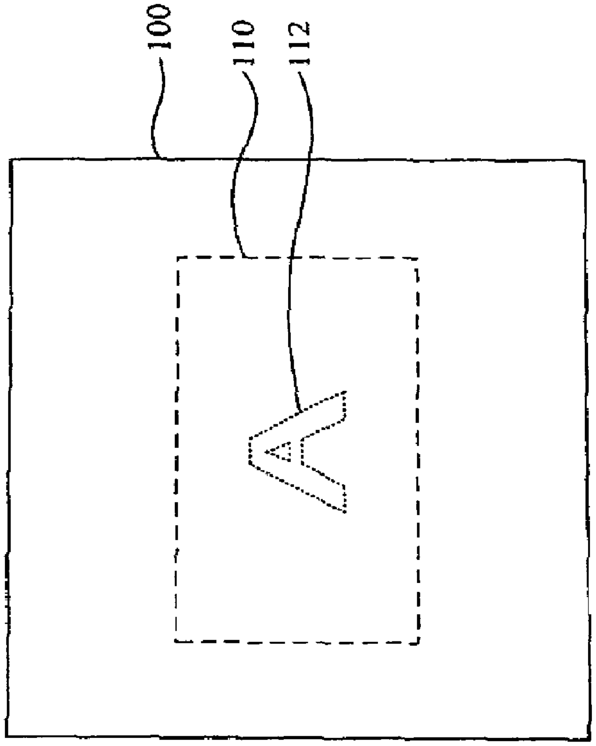
FIG. 4 is the object of FIG. 3 with non-visible indicia in further detail in accordance with one embodiment of the invention.
Figure 3:
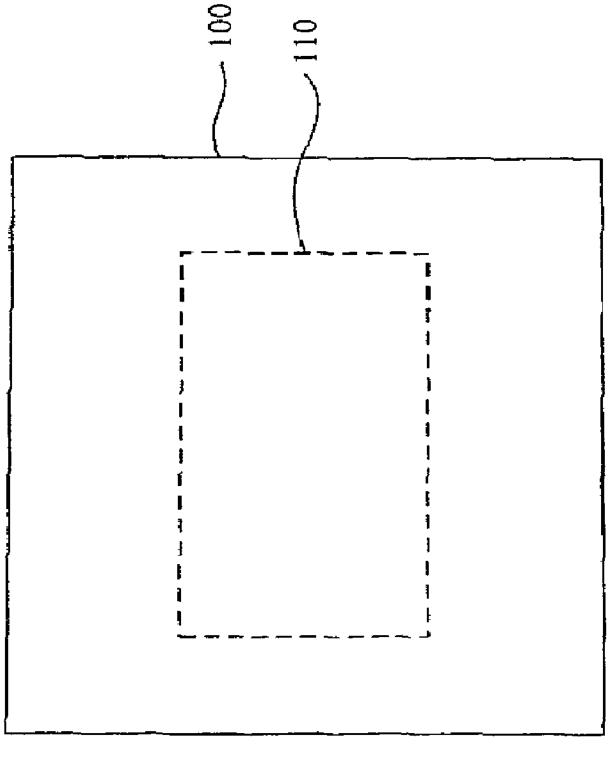
FIG. 3 is an illustrative object for authentication in accordance with one embodiment of the invention.
Figure 7:
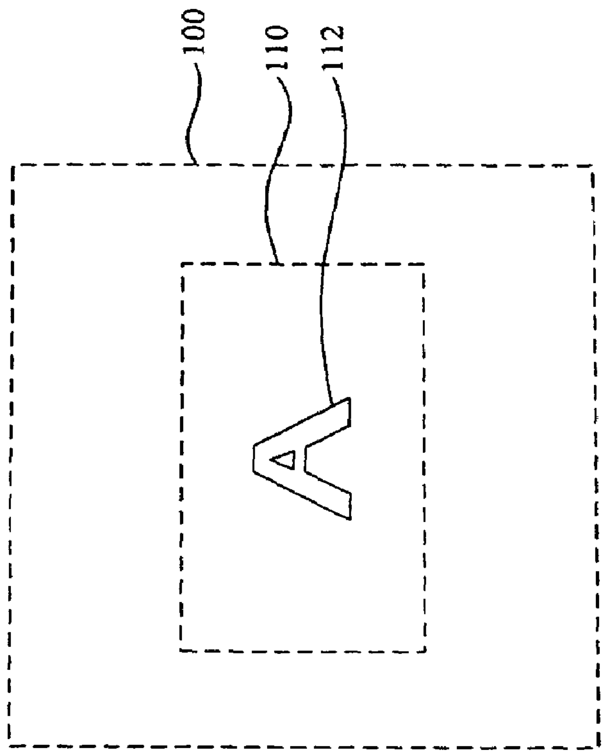
FIG. 7 is the object of FIG. 3 in further detail in accordance with one embodiment of the invention
Figure 5:
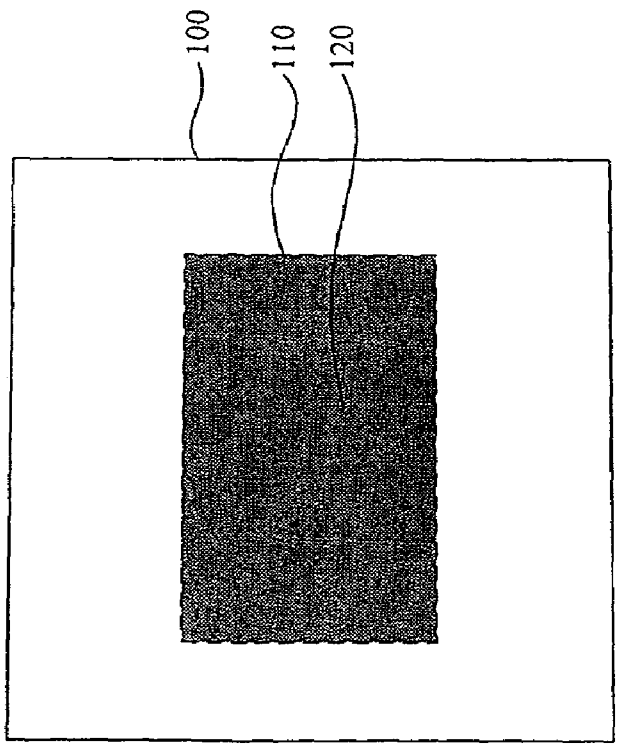
FIG. 5 is the object of FIG. 3 with an overlay layer in further detail in accordance with one embodiment of the invention.

To provide further understanding, FIGS. 3-5 are provided to illustrate the production of an object for use in the authentication system. FIG. 3 is an illustrative object for authentication in accordance with one embodiment of the invention. As shown in FIG. 3, object 100 is an object, as described herein, that includes a print region 110. As shown in FIG. 3, object 100 is illustrated in an unaltered state before either the layer of non-visible indicia or the overlay layer has been applied to the object.

In the production step, the layer of non-visible indicia is applied to the print region 110. FIG. 4 is the object of FIG. 3 following the application of the non-visible indicia. As shown in FIG. 4, object 100 includes a layer of non-visible indicia 112 printed upon print region 110. The layer of non-visible indicia 112 includes a first substance visible in the infrared portion of the electromagnetic spectrum. As discussed previously, it should be appreciated that although the layer of non-visible indicia 112 contains a first substance that is visible in the infrared portion of the electromagnetic spectrum, the layer of non-visible indicia 112 may further contain pigments that render the layer of non-visible indicia 112 visible in the visible light portion of the electromagnetic spectrum as well.

To complete the production of the object for use in the authentication system, an overlay layer is applied to the print region to cover the layer of non-visible indicia. FIG. 5 is the object of FIG. 3 with the overlay layer in further detail in accordance with one embodiment of the invention. As shown in FIG. 5, the overlay layer 120 is applied to print region 110 to cover the layer of non-visible indicia 112 and obscure any portions of the layer of non-visible indicia 112 visible in the visible light portions of the electromagnetic spectrum. The overlay layer 120 includes a substance visible in the visible light portion of the electromagnetic spectrum and which is not visible outside of this portion.

In another embodiment of the invention, digitally scrambled or variable encoded indicia or images, such as those described in U.S. Pat. No. 5,708,717, may be printed as, or on top of, the overlay layer. These scrambled or encoded indicia and images may be viewed using a lenticular decoder lens, such as described in U.S. Pat. No. 5,708,717, or a digital imaging device having descrambling software. In another embodiment, these methods may be employed to produce objects using multi-layer double frequency encoding, or optical pattern magnification, or any combination of the anti-counterfeiting techniques described herein and in U.S. Pat. No. 5,708,717, which is incorporated by reference in its entirety.

Other various optical patterns and printing techniques as are known in the art may also be used to create other types of encoded images that may be used in the overlay layer to add additional anti-counterfeiting protection.

Following production, the objects are distributed in accordance with known distribution techniques. It is during the distribution stage that counterfeit goods present substantial problems to manufacturers. While authentic products may have been distributed into the commercial stream, other counterfeit goods may have made their way to legitimate wholesalers, retailers and storage facilities, without any culpability on the part of the individuals in possession of the counterfeit goods. Therefore, the investigation and inspection of goods in the field represented as originating from a certain manufacturer is an important part of protecting the manufacturer's goodwill.

Figure 6:
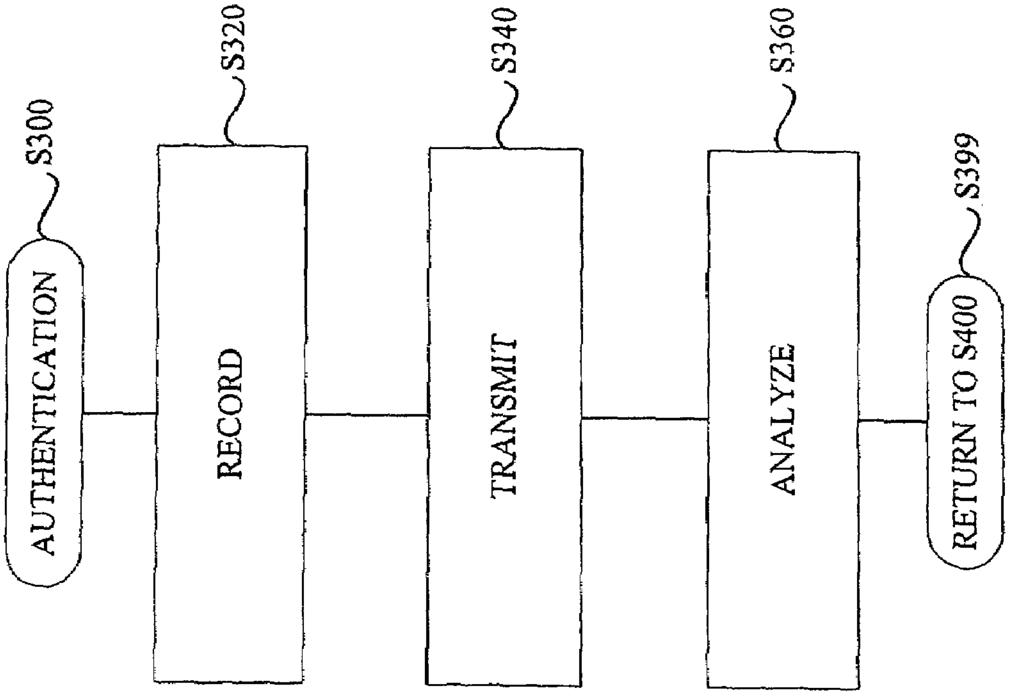
FIG. 6 is a flowchart illustrating the authentication step of FIG. 1 in further detail in accordance with one embodiment of the invention.

FIG. 6 is a flowchart illustrating the authentication step of FIG. 1 in further detail in accordance with one embodiment of the invention. As shown in FIG. 6, the authentication process begins in step S300, and passes to step S320. The viewing and recording of an optical image of the object occurs in step S320. The recording of the optical image of the object may be accomplished with any digital imaging device that supports viewing of the non-visible indicia, which in the above-described embodiments means an imaging device with infrared viewing capabilities, although the viewing capabilities may vary depending on the non-visible wavelengths of the particular non-visible indicia.

For example, a video or still digital camera with infrared viewing capabilities may be used to render the layer of non-visible indicia such that it can be perceived by the human eye when viewing an optical image of the object created by the imaging device. This viewing capability may be enhanced by using one or more filters attached to the camera lens to exclude light having a wavelength in the visible region. The viewing capability may be even further enhanced by using one or more filters that exclude all light having wavelengths except for light having a particular, sought-after wavelength known to be emitted by the non-visible indicia when stimulated by a particular source of electromagnetic radiation. For example, ink or toner may be used to print the layer of non-visible indicia that is known to have an emission band of 845 nm, for example, when stimulated by electromagnetic radiation having a wavelength of 930 nm, for example. A filter may then be used with the imaging device that excludes all other light, regardless of whether that light is visible, except for light having a wavelength of 845 nm.

It should be appreciated that digital cameras record discrete numbers for storage, on a flash memory card, floppy disk, hard disk, or other storage device, as intensities of red, green and blue, which are stored as variable charges in a CCD matrix. The recorded images may be transferred to a computer or other system, such as a central authentication system, via a network connection, such as by e-mail or other file transfer method.

In at least one embodiment, a digital phone with camera attachment may be used. For those digital phones with camera capabilities, the recorded images could be sent by e-mail directly to a central system for later analysis.

As discussed previously, in accordance with certain exemplary embodiments of the invention, the object for authentication may be located a large distance away from the observer. Thus, the utilization of a device that includes zoom capabilities increases inspection efficiency. For example, the imaging device may use its lenses to change the focal length of the digital recording device using optical and digital zoom. The digital zoom is performed in software and may augment the optical zoom.

The optical image of the object is then transmitted in step S340. As described above, the recorded images of the object, and more specifically, the print region having the non-visible indicia and the overlay layer, may be transmitted to another system for analysis at a location apart from the location of the objects being authenticated. This supports the use of authentication systems, or digital imaging devices, in the field to record images of objects at a certain location, attach identification information to each image identifying the source location where the images were recorded, and transmit the images to an offsite facility for analysis by staff assigned to review images captured in the field.

Returning to FIG. 6, in step S360, the optical image of the object is analyzed. The analysis may involve any authentication determination in which an individual reviews the images recorded in the field against an expected authentication set of indicia printed on the authentic objects produced by the manufacturer prior to distribution into the commercial stream. For example, this may include examining the logo or image captured by the imaging device against a company logo imprinted on the object to be authenticated. Or for example, the captured image may be compared against a table or array of authentic indicia which is maintained separately from the object to be authenticated. Those objects that do not include the correct infrared image would be recognized as potentially counterfeit items. At the conclusion of the authentication of the object, the process then passes to step S399, wherein the process returns to step S400.

Figure 8:
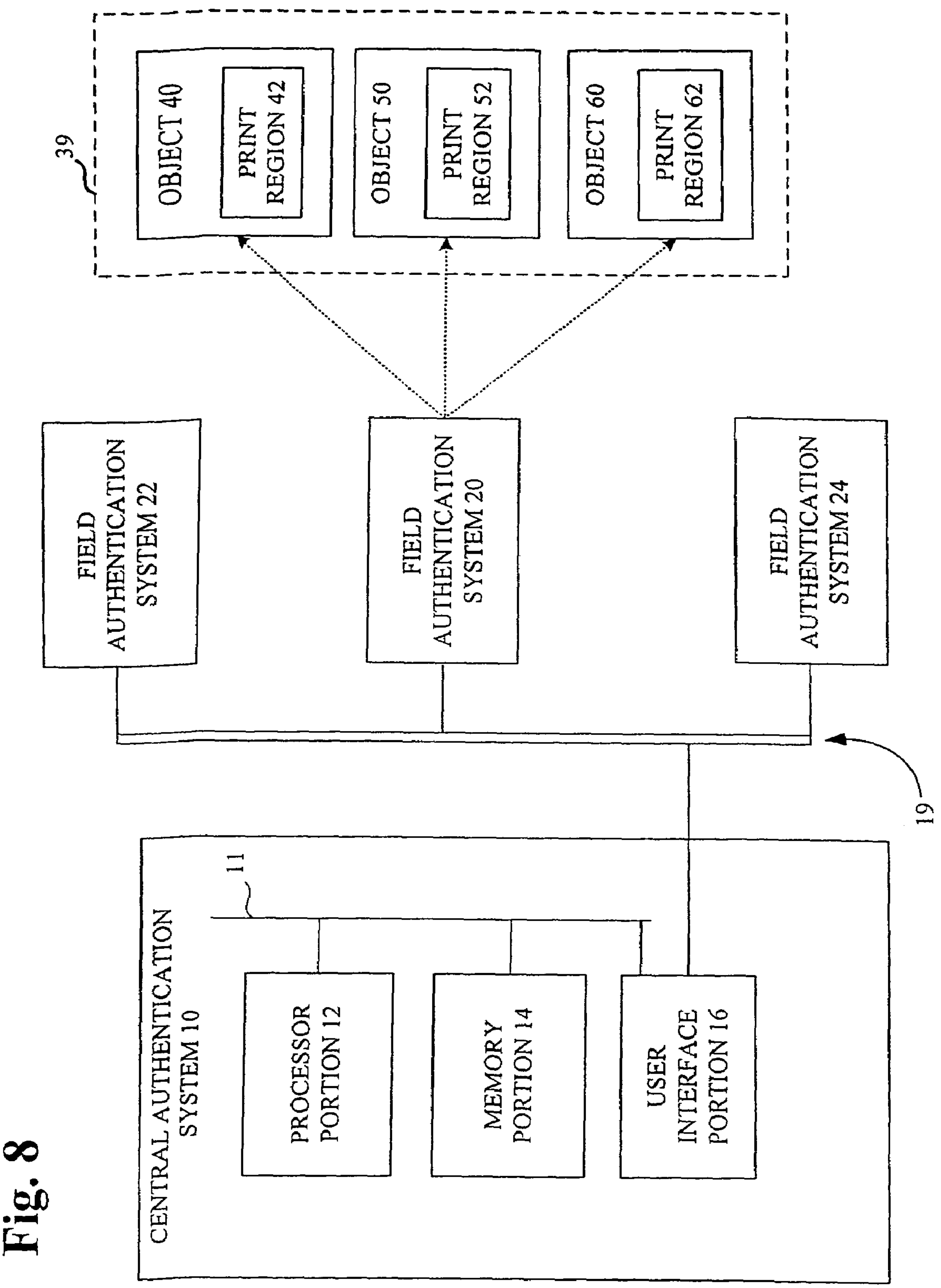
FIG. 8 is an illustrative system for authenticating an object in accordance with one embodiment of the invention.

As described above, the optical image of the object is analyzed to determine its authenticity. In accordance with one embodiment, this includes observing the object with an infrared device. Accordingly, the non-visible indicia becomes visible to the human eye when viewed through the infrared device. To provide further illustration, FIG. 8 is provided to show the effect of viewing the object through the use of an infrared device. FIG. 8 is the object of FIG. 4 in further detail in accordance with one embodiment of the invention. As shown in FIG. 8, non-visible indicia 112 on object 100 becomes visible to the human eye through the use of the digital imaging device, which in this embodiment uses infrared viewing capabilities.

When either or both the non-visible and overlay layer are printed as encoded images, authentication analysis further comprises decoding the encoded images to produce an authentication image when decoded with a decoding device. This may include viewing the encoded image with a lenticular lens having a frequency matching that of the encoded image to provide a second level of authentication.

In certain embodiments of the invention, optical images may be recorded of a series of objects in a warehouse and transmitted to a central authentication system for analysis. For example, the optical images of the objects which show the non-visible indicia may raise a question about the authenticity of a particular object when compared to the expected authentication indicia, such as if the perceived non-visible indicia appears distorted or aberrant. In that case the object can be located at the warehouse using identification information associated with the optical image of that object. The object can then be subjected to further scrutiny by attempting to decode an encoded image located on the object, such as if either the layer of non-visible indicia or the overlay layer comprises an encoded image. If the encoded image reveals the authentication image, the object may be verified as authentic. If it does not, the object may be further identified as a possible counterfeit.

Authentication System

In accordance with another embodiment of the invention, a system for the authentication of a plurality of objects having a print region with printed material contained thereon is disclosed. As discussed above, the printed material includes a layer of non-visible indicia that emits light outside of a visible range of an electro-magnetic spectrum when stimulated with electromagnetic radiation.

FIG. 8 is an illustrative system for authenticating an object in accordance with one embodiment of the invention. As shown in FIG. 8, the system includes a central authentication system 10 and a plurality of field authentication systems 20, 22, and 24. Each field authentication system 20, 22 and 24 is in selective network communication with the central authentication system 10 through a network 19. It should be appreciated that the network 19 may include any suitable network connection, as described herein, that may be employed to communicate with, provide input to, and receive input from the central authentication system 10.

As shown in FIG. 8, the central authentication system 10 includes a processor portion 12 for processing input from and generating output to the field authentication systems in communication with the central authentication system 10. The central authentication system 10 further includes a memory portion 14. In operation, the processor portion 12 retrieves data from and stores data for use by the central authentication system 10 in the memory portion 14. It should be appreciated that the various memory components contained in the memory portion 14 may take on a variety of architectures as is necessary or desired by the particular operating circumstances. Further, the various memory components of the memory portion 14 may exchange data or utilize other memory component data utilizing known techniques, such as relational database techniques.

As shown in FIG. 8, the central authentication system 10 further includes a user interface portion 16 for accepting input from and transmitting output to the various field authentication systems communicating with the central authentication system 10. The user interface portion 16 provides the interface through which the users can provide input to and receive output from the central authentication system 10. The user interface portion 16 is controlled by the processor portion 12, or components thereof, to interface with a user or other operating system, including inputting and outputting data or information relating to the central authentication system 10.

Referring to FIG. 8, each of the processor portion 12, memory portion 14 and user interface portion 16 are connected to and in communication with each other through a data bus 11. It should be appreciated that the central authentication system 10 may utilize components from each of the processor portion 12, memory portion 14 and user interface portion 16.

In operation, an individual using a field authentication device 20 may be investigating reports that counterfeit goods may have been sold to a retailer maintaining a certain location 39. Accordingly, field authentication system 20 is used to record optical images of object 40 with print region 42, object 50 with print region 52, and object 60 with print region 62. The images are then transmitted from the field authentication system 20 through the network 19 to the central authentication system 10, wherein the images are stored in the memory portion 14. The images may be recorded in a database associated with the particular field authentication system that delivered them, the location they were recorded at, the time they were recorded, the manufacturer's products being investigated or other information used for identification and association with the optical images, for example. Accordingly, in at least one embodiment of the invention, the central authentication system 10 may comprise a facility maintained by an administrator that reviews recorded images for several manufacturers and reports instances of counterfeit goods, or suspected counterfeit goods, as they are discovered.

It should be appreciated that the system of the invention or portions of the system of the invention may be in the form of a "processing machine," such as a general purpose computer or other network operating system, for example. As used herein, the term "processing machine" is to be understood to include at least one processor that uses at least one memory. That at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As described above, the processing machine executes the instructions that are stored in the memory or memories to process data. This processing of data may be in response to commands by a user or users of the processing machine, in response to previous processing, in response to a request by another processing machine and/or any other input, for example.

As stated above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, an integrated circuit, a logic circuit, a digital signal processor, a programmable logic device, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, WAN, VAN, an Ethernet, or any client server system that provides communication, for example. Such communications technologies may use any suitable protocol such as TCP/IP, UDP, or OSI, for example.

The set of instructions used in the processing of the invention may be in the form of a program or software. The software may be in the form of system software, application software, a collection of separate programs, a program module within a larger program, or a portion of a program module, for example. The software used might also include modular programming in the form of object oriented programming. Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

It should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Many embodiments and adaptations of the present invention other than those herein described, will be apparent to those skilled in the art by the foregoing description thereof, without departing from the substance or scope of the invention. While the present invention has been described herein in detail in relation to its exemplary embodiments, it is to be understood that this disclosure is only illustrative and exemplary of the present invention. Accordingly, the foregoing disclosure is not intended to limit the scope of the present invention which is defined by the claims and their equivalents.

What is claimed is:

1. A method for authenticating an object, the method comprising:

providing a least one object having a print region with printed material contained thereon comprising a layer of non-visible indicia, at least a portion of which is formed from an emitting substance that emits at least one wavelength of light outside a visible range of an electromagnetic spectrum when stimulated with electromagnetic radiation, the non-visible indicia comprising optically decodable encoded authentication indicia;

creating a digital image of the layer of non-visible indicia with an imaging device such that the layer of non-visible indicia can be perceived by a human eye viewing the digital image;

transmittting the digital image to a facility remote from the imaging device; and decoding the encoded authentication indicia.

2. A method of claim 1 further comprising:

digitally encoding an authentication image to produce the optically decodable encoded authentication indicia; and applying the layer of non-visible indicia including the encoded authentication indicia to the print region of at least one of the at least one object.

3. The method of claim 1, further comprising:

comparing the decoded authentication indicia to expected authentication indicia to verify the authenticity of the object.

4. The method of claim 3, wherein the actions of decoding and comparing are carried out by a central authentication system at the facility remote from the imaging device.

5. A method of claim 1, wherein the digital image is transmitted over a network.

6. The method of claim 5, wherein the network is the Internet.

7. The method of claim 5, wherein the network is a telecommunications network.

8. The method of claim 1, wherein the action of decoding the digitally encoded authentication indicia is carried out using the digital image and software-based digital decoder.

9. The method of claim 1, wherein the emitting substance emits one of a set consisting of infrared light and ultraviolet light when stimulated with electro-magnetic radiation.

10. A method of claim 1, wherein the digital image is transmitted with a request for authentication of the object.

11. A method of claim 1, further comprising:

recording the digital image.

12. A system for authenticating an object having a print region with printed material contained thereon, the printed material including a layer of non-visible indicia that emits light outside of a visible range of an electro-magnetic spectrum when stimulated with electro-magnetic radiation and that comprises optically decodable encoded authentication indicia, the system comprising:

at least one imaging device capable of creating and recording a digital image of the non-visible indicia, the imaging device additionally capable of transmitting the digital image to a facility remove from the imaging device;

means for decoding the encoded authentication indicia; and a central authentication system in communication with the at least one imaging device, the central authentication system comprising means for receiving the digital image transmitted by the at least one imaging device and means for comparing the authentication result to predetermined authentication indicia.

13. The system of claim 12 wherein the central authentication system further comprises a database adapted for storage and retrieval of at least one of the set consisting of transmitted digital images received by the central authentication system and the predetermined authentication indicia.

14. The system of claim 12 wherein the means for decoding the encoded authentication indicia includes a software-based decoder adapted for digitally decoding the encoded authentication indicia from the digital image.

15. A system for authenticating an object having a print region with a layer of indicia printed thereon, the indicia being viewable in a predetermined electromagnetic wavelength range, the system comprising:

at least one imaging device capable of viewing the print region of the object in a predetermined electromagnetic wavelength range, recording a digital image of the object, and transmitting the digital image;

a central authentication system remote from and in communication with the at least one imaging device, the central authentication system being adapted to receive the image transmitted by the imaging device; and means for analyzing the image whether the print region of the object includes indicia that are visible in the predetermined electromagnetic wavelength range.

16. The system of claim 15 wherein the central authentication system is in communication with the at least one imaging device via network.

17. The system of claim 15 wherein the central authentication system comprises a database adapted for storage of digital images received from the imaging device.

* * * * *